June 5, 1956  H. G. LAKE  2,749,513
DIELECTRIC TEST BOX AND AUXILIARY SWITCH BOX
Filed March 10, 1955  2 Sheets-Sheet 1
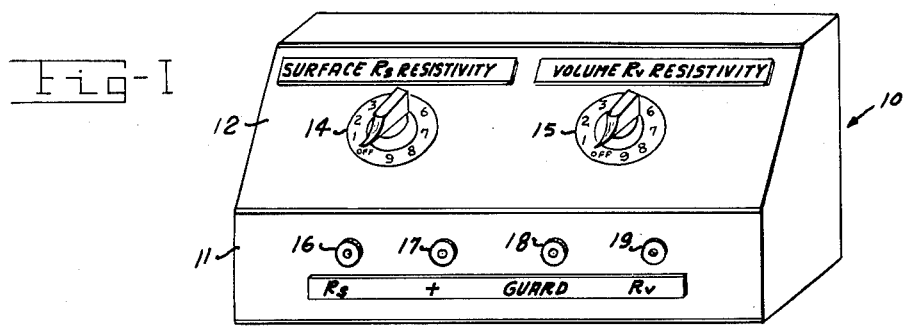
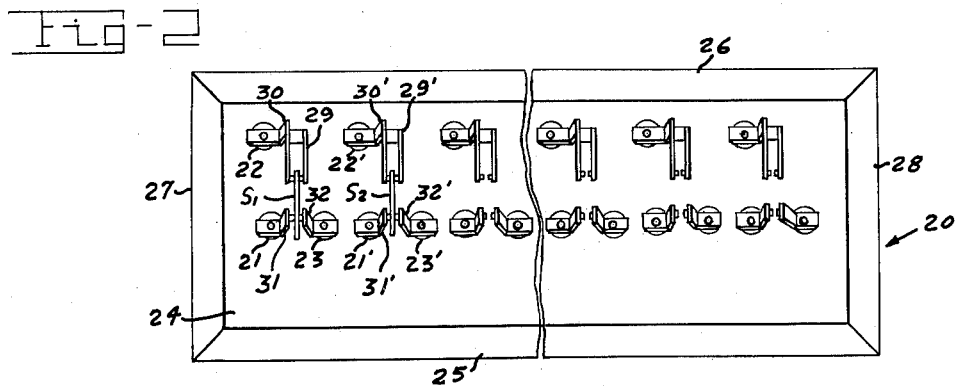
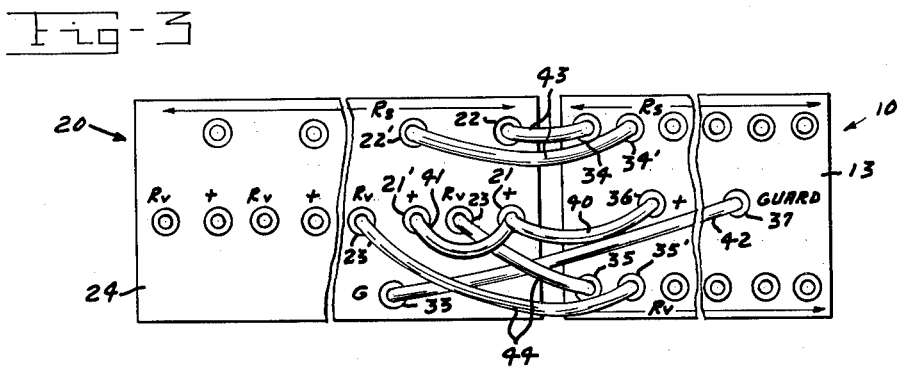
INVENTOR.
HARRY G. LAKE
BY Donald C. Keaveney
Wade Koontz
ATTORNEYS

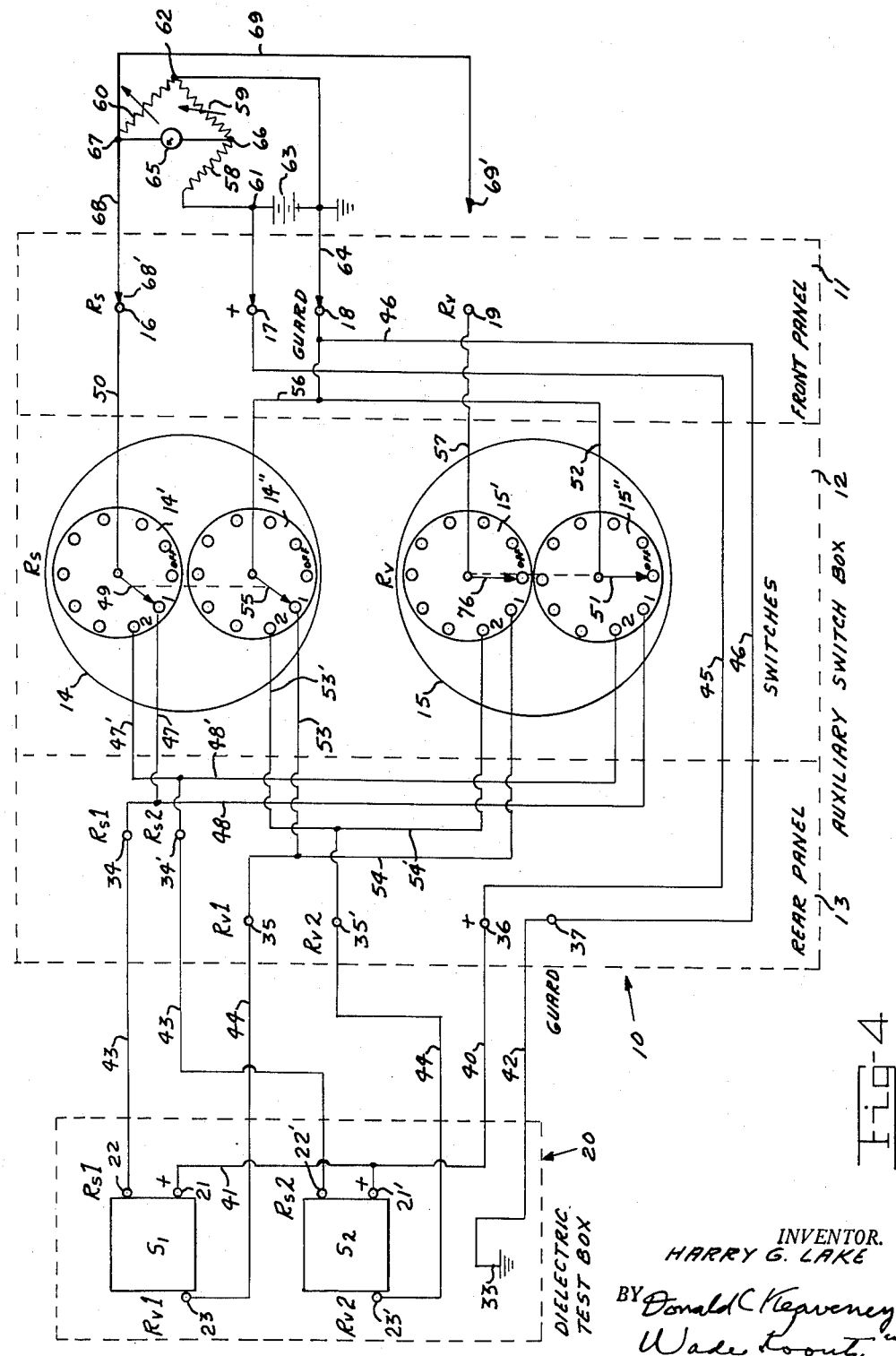

United States Patent Office 2,749,513
Patented June 5, 1956

2,749,513

DIELECTRIC TEST BOX AND AUXILIARY SWITCH BOX

Harry G. Lake, Newark, N. J., assignor to the United States of America as represented by the Secretary of the Air Force Application March 10, 1955, Serial No. 493,582

3 Claims. (Cl. 324—65)

(Granted under Title 35, U. S. Code (1952), sec. 266)

The invention described herein may be manufactured and used by or for the United States Government for governmental purposes without payment to me of any royalty thereon.

This invention relates to apparatus for measuring surface or volume resistivity of electrical insulators or dielectrics such as plastics or other materials, and more particularly to such test apparatus intended for use with an oven or other means for controlling ambient conditions of temperature and/or humidity. It is frequently desirable in such test procedures to be able to test a plurality of samples of dielectric in very quick succession without removing them from the oven so that the controlled ambient conditions will not vary substantially between readings. The plurality of samples may be desirable either in order to obtain an average value for different samples of the same material, or in order to compare individual samples of a plurality of different materials under substantially identical conditions.

Therefore, it is an object of this invention to provide means for measuring either surface or volume resistivity of any one of a plurality of samples of dielectric either under prevailing atmospheric conditions or under conditions of controlled temperature or humidity, or both.

It is a further object of this invention to provide such apparatus which is compact, and is capable of quick, simple and foolproof operation, and which will give precise results.

These objects are achieved by mounting each of a plurality of samples of dielectric between three spring contacts in a test box which is of a size and material adapted to be inserted in an oven operated at high temperatures and controlled humidity. Electrical connection is made from the contact terminals on the test box to input terminals on the rear panel of an auxiliary switch box located outside of the oven. The circuitry of the test box and switch box is such that either the surface resistivity or the volume resistivity of any selected one of the samples of dielectric may be made to appear at output terminals on the front of the switch box by suitable setting of its switches. Any suitable measuring device such as a Wheatstone bridge may then be connected to the appropriate output terminals of the switch box so that readings for either resistance of any selected sample may be obtained in quick succession without removing the test box from the oven or changing its connections, but merely by proper manipulation of the switches and bridge.

The invention will be described in greater detail, and other objects and advantages will become apparent in the following specification and drawings in which like reference numerals refer to like parts throughout, and wherein:

Fig. 1 is a perspective view showing the front panel and switch panel of the auxiliary switch box.

Fig. 2 is a broken front view of the dielectric test box showing the sample holders mounted therein with samples in two of the holders.

Fig. 3 is a broken rear view showing the back panels of the switch box and test box and the connections between the boxes for two samples.

Fig. 4 is a circuit diagram showing the connections from two samples in the test box to the switch box and bridge.

Referring now to the drawings, switch box 10 is shown as having a front panel 11, a switch panel 12, and a rear panel 13. Mounted on switch panel 12 are two plural positions, two wafer switches 14 and 15 marked $R_s$ and $R_v$ respectively on the panel. Each of these switches has one off position and one additional position for each sample to be tested. It is obvious that the number of switch positions, and hence the number of samples provided for, can be arbitrarily varied in constructing the apparatus either by choosing switches with a larger number of positions or by using a larger even number of switches. Front panel 11 has output terminals 16, 17, 18 and 19 marked $R_s$, +, Guard, and $R_v$ respectively and rear panel 13 has input terminals 34, 35, 36 and 37 marked $R_s$, $R_v$, +, and Guard respectively. The connections between the switches and terminals will be described below:

Referring now to Fig. 2, dielectric test box 20 is shown as a five wall box having its front open and having side walls 25, 26, 27 and 28, and a metallic back wall 24. Projecting through the back wall 24 and insulated therefrom by any conventional means are a plurality of terminals arranged in groups of 3 as shown for example at 21, 22, and 23 and at 21', 22' and 23'. Each group of terminals accommodates one sample of dielectric such as $S_1$ and $S_2$. The three terminals of each group are placed at the corners of an imaginary right triangle on the back wall of the test box so that contact and supporting arms attached to the terminals at the end within the box will be in position to support the flat slab samples of dielectric between them. As shown, terminals 21 and 21' have spring contact arms 31 and 31' attached to them at the end within the test box; terminals 23 and 23' have spring contact arms 32 and 32' attached to them within the test box; and terminals 22 and 22' have spring contacts 30 and 30' attached to them within the test box. Terminals 22 and 22' also have insulating support arms 29 and 29' attached to them in addition to contact arms 30, 30'. These contact and support arms are arranged as may be seen in Fig. 2 so that the samples of dielectric $S_1$ and $S_2$ as shown by way of example, may be inserted and held between them. The spring contact arms thus serve not only to support the dielectric but also to make electrical contact with three desired points on the dielectric samples. Contact arms 30 and 31 make contact on the same surface of the dielectric and hence surface resistivity is measured between them. Contact arms 31 and 32 make contact on opposite surfaces of the dielectric and are so placed as to make contact at points which are directly opposite each other on the two surfaces of the dielectric so that volume resistance may be measured between these points along a line perpendicular to the surface of the dielectric.

Fig. 2 shows only six groups of terminals of which only two have dielectric samples inserted therein. It is of course understood as indicated by the break in the figure that provision may be made for any desired number of samples. Only two samples are shown by way of example in order to simplify the drawings.

Referring now to Fig. 3, 13 indicates the rear panel of switch box 10 and 24 indicates the rear panel of test box 20. Again each of these panels is shown broken in the drawing to indicate that any desired number of terminals may be used according to the number of samples desired. The back panel 13 of switch box 10 has input terminals 34 and 34' which are marked $R_s$, and input terminals 35 and 35' which are marked $R_v$, there being one $R_s$ and one $R_v$ terminal for each sample to be tested. Panel 13 is also provided with a single terminal 36 which is marked + and another single terminal 37 which is marked "Guard." These terminals are preferably conventional jack and plug arrangements. Suitable connections are made from these terminals to the sample holder terminals extending through the back of the rear panel 24 of test box 20 as will be explained in detail below in connection with Fig. 4. The drawing shows such connections as being made by individual leads, 40, 41, 42, 43 and 44, but it is understood that all leads could be combined in a single cable leading through or to any suitable connector to facilitate heat insulation problems of the oven in which test box 20 may be placed.

Terminals 21, 21' marked +, 22, 22' marked $R_s$ and 23, 23' marked $R_v$ are shown as extending through rear panel 24 so that the individual leads or the cable strands may be permanently connected thereto as by soldering or fastened thereto by means of any suitable binding post. Terminal 33 is simply a direct connection to the metal panel 24 which serves as a ground. Lead 42 is soldered to terminal 33 and its other end may be plugged in to terminal 37 on panel 13 of switchbox 10.

Referring now to Fig. 4, circuit connections to measure the surface resistivity and volume resistivity of samples $S_1$ and $S_2$ are shown. The switch setting shown is in position to measure the surface resistivity of sample $S_1$ only. However, the other measurements may be made by making no circuit changes other than altering the position of the switches 14 and 15 to select the sample number, and changing plugs from $R_s$ to $R_v$ on the front panel to change from surface to volume resistivity.

In Fig. 4, sample $S_1$ is shown mounted between the spring contact arms of terminals 21, 22 and 23. Terminal 21 is connected by a jumper 41 to the corresponding + terminal of all other samples, and is connected by a lead 40 to the single + input terminal 36 on the rear panel of the switch box. Terminal 36 is directly connected by a lead 45 within the switch box to an output terminal 17 marked "+" on the front panel thereof. Output terminal 18 marked "Guard" on the front panel of the switch box is directly connected by a lead 46 to terminal 37 on the rear panel thereof; 37 is connected by a lead 42 to the terminal 33 which, as noted above, is simply a direct connection to the metallic rear panel 34 of the test box which serves as a ground.

Terminal 22 of sample $S_1$ and corresponding terminals of other samples are connected by leads 43 to terminals 34, 34' etc. on the rear panel of the switch box. Terminal 34 in turn is connected by leads 47 and 48 to the No. 1 terminals of the upper wafer 14' of switch 14 and of the lower wafer 15" of switch 15, while terminal 34' is connected by leads 47', 48' to the No. 2 terminals of the same wafers. Similar connections are made for each additional sample to be tested. Switch arm 49 of wafer 14' of switch 14 is connected by lead 50 to output terminal 16 which is marked $R_s$ on the front panel of the switch box. Switch arm 51 of the lower wafer of switch 15 is connected by lead 52 to output terminal 18 marked "Guard" on the front panel of the switch box.

Terminal 23 of sample $S_1$ and corresponding terminals of other samples are connected by leads 44 to terminals 35, 35' etc. on the rear panel of the switch box. Terminal 35 in turn is connected by leads 53 and 54 to the No. 1 terminals of the lower wafer 14" of switch 14 and the upper wafer 15' of switch 15. Terminal 35' is connected by leads 53' and 54' to the No. 2 terminals of wafers 14" and 15' respectively. Similar connections are made for each additional sample to be tested, the terminal position numbers corresponding to the sample number from which the lead comes. Switch arm 55 of wafer 14" is connected by a lead 56 to terminal 18 marked "Guard" and switch arm 76 of wafer 15' is connected by lead 57 to terminal 19 marked $R_v$ on the front panel. Arms 49 and 55 of switch 14 are gauged to occupy the same relative position as are arms 76 and 51 of switch 15.

Fig. 4 shows the switches set to measure the surface resistance of sample $S_1$. This resistance is connected between the terminals 17 and 16 on the front panel of the switch box as follows: from terminal 17 via lead 45 to terminal 36, lead 40 and terminal 21 of sample $S_1$; through the surface resistance of $S_1$ to terminal 22 from terminal 22 of sample $S_1$ via lead 43 to terminal 34 and lead 47 to #1 position of wafer 14', thence through switch arm 49 and lead 50 to terminal 16. It will be noted that when the surface resistance of sample $S_1$ is connected to be measured the volume resistance of this sample is automatically shunted to ground. This may be seen as follows: terminal 17 through lead 45, terminal 36, lead 40 and terminal 21, across the volume resistance to terminal 23, thence lead 44 to terminal 35, from which extend leads 53 and 54. Lead 54 goes to an open terminal on switch 15 since it is in the off position. Lead 53 goes to terminal 1 of wafer 14" which is connected by lead 56 to terminal 18 which in turn is grounded.

A Wheatstone bridge circuit is shown connected to the output terminals 17 and 16 on the front panel of the switch box. It is, however, understood that any suitable means of measuring resistance may be used in place of the bridge circuit shown. The bridge consists of a fixed resistance 58 and two variable resistances 59 and 60. The fourth arm of the bridge is of course the resistance to be measured and will appear between terminals 17 and 16 or 17 and 19, i. e. between + and $R_s$ or + and $R_v$ on the front panel according to the setting of the switches 14 and 15. Since, as noted above, switch arms 49 and 55 of switch 14 are gauged as are switch arms 76 and 51 of switch 15, $R_v$ of sample 1 is automatically shorted to ground through arm 55 when arm 49 is set to measure $R_s$ of sample 1, and hence will not in any way affect the desired measurement. Similar considerations apply to all other settings.

The bridge has input terminals 61, 62 between which a battery 63 is connected. The negative pole of the battery is connected by lead 64 to terminal 18 and is also connected to an external ground. An ammeter 65 or any other suitable null detecting device is connected between the output terminals 66 and 67 of the bridge. Output terminal 67 may also be connected by lead 68 and plug 68' to terminal 16 on the switch box or by lead 69 and plug 69' to terminal 19 on the switch box thus placing the resistance to be measured in the fourth arm of the bridge.

In operation, samples are placed in the test box which is then placed in an oven. It is apparent that the resistance to be measured will be connected between the terminals 61 and 67 of the bridge by the above described switch settings and circuitry within the switch box and the test box. What resistance will be so connected depends upon the setting of the switches 14 and 15 and the connection of plugs 68' and 69'. Thus if it is desired to measure surface resistance of $S_1$, switch 14 is set in #1 position, switch 15 is set in off position, and plug 68' is placed in terminal 16 as shown in Fig. 4. Resistances 59 and 60 are then varied in the usual manner until a balance is indicated by detector 65 and the value of the resistance is then determined from the ratio of the bridge arms. Having made this measurement the only changes of circuitry needed to connect a different resistance between bridge terminals 61 and 67 is to alter the position of the switches 14 and 15 and/or plugs 68' and 69'. Thus if it were desired to measure the volume resistance of sample $S_1$ switch 14 would be set to off position and switch 15 would be set to #1 position with plug 68' removed and plug 69' connected.

Thus it is seen that I have provided apparatus for measuring either the surface or the volume resistivity of any one of a plurality of samples of dielectric which apparatus is extremely compact and capable of very quick and simple operation to give precise results. The apparatus can of course be used for measurements under room temperature and humidity but is primarily intended for measurements under controlled ambient conditions. In this latter use the simplicity of the changes necessary to select either parameter of any one of a plurality of samples permits speed of operation. The fact that no changes are necessary within the test box in the oven to make such a selection permits accurate control of ambient conditions; and the fact that the resistance not being measured is automatically shorted to ground assures precise results. Although a preferred embodiment of the invention has been described in detail above it is understood that this is by way of illustration and example only and that the scope of the invention is defined solely by the appended claims.

What I claim is:

1. Apparatus for measuring surface and volume resistivity of dielectrics comprising, a dielectric test box adapted to be placed in a chamber having controlled temperature and humidity, said box having at least one metallic wall which serves as a terminal and mounting panel for a plurality of samples of dielectric, a group of three terminals for each said sample, said terminals being insulated from and extending through said wall, the terminals of each group being placed at the corners of a right triangle on said wall, the first terminal of each said group of terminals having an insulating support arm and a first spring contact arm connected to the end of the terminal within said box, the second and third terminals of each said group of terminals each having a single spring contact arm connected to the end of the terminal within said box, said support arm and said first spring contact arm, and said second and third spring contact arms being arranged in opposed relation to hold a flat slab sample of dielectric between them so that electrical contact is made by said first and second contact arms at first and second points on one side of said sample and by said third contact arm at a third point on the other side of said sample, said third point being directly opposite said second point on said sample; the first, second, and third contact points on each sample being connected through said contact arms and their respective terminals to remote means for selectively connecting the resistance appearing between said first and second or said second and third contact points of any selected sample to means for measuring said resistance.

2. Apparatus as in claim 1 wherein said remote selective connecting means comprises a switch box, said switch box containing first and second two wafer plural position switches, each said switch having on both of its wafers an open terminal "off" position and one terminal position for each sample to be tested, said samples and said switch positions being correspondingly numbered, the switch arms on the two wafers of each switch being ganged to occupy the same position on each wafer of the switch; the first terminal of each of said samples of dielectric being connected to the first wafer of the first switch and to the second wafer of the second switch at the respective wafer terminal positions corresponding to the sample number of said first terminal, the switch arm of said first wafer of said first switch being connected to an output terminal marked "$R_s$" on said switch box, the switch arm of said second wafer of said second switch being connected to an output terminal marked "G" on said switch box; the third terminal of each of said samples of dielectric being connected to the second wafer of the first switch and to the first wafer of the second switch at the respective wafer terminal positions corresponding to the sample number of said third terminal, the switch arm of the second wafer of the first switch being connected to said output terminal marked "G" and said output terminal marked "G" also being directly connected to the metallic wall of said test box, the switch arm of the first wafer of said second switch being connected to an output terminal marked "$R_v$" on said switch box; the second terminal of each of said samples of dielectric being directly connected to an output terminal marked "plus" on said switch box, whereby when either the surface resistance appearing between the first and second contact points for the volume resistance appearing between the second and third contact points of any selected sample is connected between output terminals "$R_s$" and "plus," or "$R_v$" and "plus" respectively by setting said first or second switch respectively to its terminal number corresponding to the desired sample number and setting the other switch to "off," the undesired resistance of the selected sample is automatically connected to ground.

3. Apparatus as in claim 2 wherein said means for measuring said resistance comprises three impedances which form with the resistance to be measured a Wheatstone bridge circuit, at least one of said three impedances being variable, said bridge circuit having two input terminals and two output terminals, a source of electromotive force connected between said two input terminals and also connected between the output terminals marked "plus" and "G" on said switch box, said "G" terminal also being connected to an external ground, means to connect either of the output terminals marked "$R_s$" and "$R_v$" on said switch box to a first of said output terminals of said bridge, and a null detecting device connected between said first output terminal and the other output terminal of said bridge.

References Cited in the file of this patent

UNITED STATES PATENTS

| | | |
|---|---|---|
| 1,905,412 | Kasson | Apr. 25, 1933 |
| 2,643,287 | Moeller | June 23, 1953 |